United States Patent
Tomita

[19]

[11] Patent Number: 6,031,806
[45] Date of Patent: Feb. 29, 2000

[54] INFORMATION SIGNAL RECORDING AND REPRODUCING APPARATUS AND RECORDING AND REPRODUCING METHOD

[75] Inventor: Masami Tomita, Chiba, Japan

[73] Assignee: Sony Corporation, Tokyo, Japan

[21] Appl. No.: 09/017,244

[22] Filed: Feb. 2, 1998

[30] Foreign Application Priority Data

Feb. 4, 1997 [JP] Japan .................................. 9-021346

[51] Int. Cl.[7] ........................................................ G11B 7/00
[52] U.S. Cl. .................................. 369/58; 369/59; 369/54; 369/48
[58] Field of Search .................................. 369/54, 58, 47, 369/48, 49, 50, 59, 32; 360/48, 51, 53

[56] References Cited

U.S. PATENT DOCUMENTS

| | | | |
|---|---|---|---|
| 4,545,044 | 10/1985 | Satoh et al. ................................. | 369/32 |
| 5,295,124 | 3/1994 | Shirako .................................. | 369/54 X |
| 5,737,308 | 4/1998 | Nakai et al. ........................... | 369/59 X |
| 5,936,925 | 8/1999 | Yoshio et al. .......................... | 369/58 X |

FOREIGN PATENT DOCUMENTS 0 406 021  1/1991  European Pat. Off. .

*Primary Examiner*—Muhammad Edun
*Attorney, Agent, or Firm*—Frommer Lawrence & Haug, LLP.; William S. Frommer

[57] ABSTRACT

When an erasable region among recorded regions is selected, additional information (time information and content information) corresponding to a recording region is obtained. The elapsed time is calculated from the time information and present time information. As reference information, preserving period information of every content information is held and whether it is erasable or not is determined on the basis of the elapsed time and the preserving period information. With respect to N recorded regions, whether it is erasable or not is sequentially decided. The recorded region corresponding to the longest elapsed time among the erasable recorded regions is decided as a recording region. The recording process is executed to the decided recording region.

13 Claims, 6 Drawing Sheets

Fig. 3

REFERENCE INFORMATION

| CONTENT INFORMATION | PRESERVING PERIOD |
|---|---|
| A | a |
| B | b |
| C | c |
| ⋮ | ⋮ |

Fig. 6A

ERASABLE REGION LIST

| ORDER | RECORDING REGION NO. | CONTENT INFORMATION | TIME INFORMATION |
|---|---|---|---|
| 1 | i | B | $t_i$ |
| 2 | j | D | $t_j$ |
| 3 | k | A | $t_k$ |
| ⋮ | ⋮ | ⋮ | ⋮ |

Fig. 6B

ERASABLE REGION LIST

| ORDER | RECORDING REGION NO. | ERASABLE TIME |
|---|---|---|
| 1 | i | $T_i$ |
| 2 | j | $T_j$ |
| 3 | k | $T_k$ |
| ⋮ | ⋮ | ⋮ |

INFORMATION SIGNAL RECORDING AND REPRODUCING APPARATUS AND RECORDING AND REPRODUCING METHOD

BACKGROUND OF THE INVENTION

1. Field of the Invention

The invention relates to an information signal recording and reproducing apparatus and a recording and reproducing method, in which a recording medium is effectively used when a main signal such as video and audio signals is recorded into the recording medium.

2. Description of the Related Art

When analog data or digital data is recorded to a recording medium such as magnetic tape, magnetic disk, optical disk, or the like, there is a case where a vacant region necessary to newly record data to the recording medium does not exist. In such a case, although it is sufficient to use a new recording medium such as a blank disk, an amount of recording media increases without any restriction.

To avoid such a problem, it is considered to erase the unnecessary signals among the recorded signals. For example, in an automatic recording apparatus such as a monitor video camera having a VTR, an endless tape is used and when the signal is recorded to the end of the tape, a recording position is returned to the start of the tape and an image signal is newly recorded. It is also considered to similarly record digital data by using a ring buffer in place of the endless tape. Further, there has also been proposed a method whereby when image data is recorded onto the optical disk, new and old information is recorded onto the optical disk together with the image data and, when a recording capacity remaining in the optical disk is equal to 0, the oldest data is erased. Moreover, a method of erasing the data after the elapse of a predetermined time from the recording time has also been proposed.

However, in the data which has already recorded in the recording medium, it is improper to determine whether the data is unnecessary or not by only checking whether the data is new or old. This is because the duration of a period of time during which the user wants to preserve is influenced by the contents of the recorded signal. For instance, in a VTR for recording a television broadcasting program, among the programs, in case of programs such as news, weather forecast, or the like in which instantaneousness is required, it is sufficient that the preserving period is short. On the other hand, in case of a movie program, it is required that it is preserved for a longer period of time. In accordance with the user, there is also a case where he wants to set a preserving period on the basis of a broadcasting channel, the title of the program, and the like.

OBJECTS AND SUMMARY OF THE INVENTION

It is, therefore, an object of the invention to provide an information signal recording and reproducing apparatus and a recording and reproducing method, in which a proper preserving period can be set in accordance with contents of a main signal to be recorded.

To solve the above problems, according to the invention, there is provided an information signal recording and reproducing apparatus for selecting an arbitrary region of a recording medium and recording and reproducing, wherein an information signal recorded on the recording medium is constructed by a main signal and additional information which was made correspond to the main signal, the additional information is constructed by time information showing a recording time of the main signal and content information showing the contents of the main signal, and the apparatus comprises:

reference information holding means for holding preserving period information of every content information; and control means for performing processes such that the presence or absence of a vacant region is detected, when the vacant region exists, the signal is recorded into the vacant region, when the vacant region doesn't exist, the additional information of a recorded region is reproduced, an elapsed time of the recorded region is calculated from the time information in the reproduced additional information and present time information, whether the recorded region can be erased or not is decided from the elapsed time and the preserving period information corresponding to the content information in the reproduced additional information, and the signal is recorded to the recorded region which was determined to be erasable.

Each time the process to record the signal is performed or when the recording medium is loaded, a process to decide whether the signal can be erased or not is executed.

There is formed a list in which the erasable regions determined in the recorded region are arranged in accordance with the order corresponding to the positions before and after the time when the signal can be erased or in accordance with the order corresponding to the duration of a period of time when the signal can be erased.

According to the invention of claim 13, there is provided an information signal recording and reproducing method of selecting an arbitrary region of a recording medium and recording and reproducing, characterized in that:

an information signal recorded on the recording medium is constructed by a main signal and additional information which was made correspond to the main signal, the additional information is constructed by time information showing a recording time of the main signal and content information showing the contents of the main signal; and there are executed processes such that the presence or absence of a vacant region is detected, when the vacant region exists, the signal is recorded into the vacant region, when the vacant region doesn't exist, the additional information of a recorded region is reproduced, an elapsed time of the recorded region is calculated from the time information in the reproduced additional information and present time information, whether the recorded region can be erased or not is decided from the elapsed time and the preserving period information corresponding to the content information in the reproduced additional information, and the signal is recorded to the recorded region which was determined to be erasable.

The main signal (for instance, video and audio signals) and additional information corresponding to the main signal are recorded onto a common or different recording media. The additional information comprises time information showing the recording time and content information. Therefore, the elapsed time from the recording time to the present time can be obtained from the time information with respect to the recorded region. The contents of the main signal can be known from the content information. Since reference information to designate a preserving period is possessed every content information, the erasable region in the recorded region can be properly decided. On the basis of this decision, the unnecessary regions are erased and a new information signal can be recorded. As mentioned above, the recording region of the recording medium can be effectively used. Moreover, different from the case of deciding by only the elapsed time, a more proper process can be executed.

The above, and other, objects, features and advantage of the present invention will become readily apparent from the following detailed description thereof which is to be read in connection with the accompanying drawings.

BRIEF DESCRIPTION OF THE DRAWINGS

FIG. 3 is a schematic diagram showing an example of reference information which is used in the invention;

FIGS. 6A and 6B are schematic diagrams showing an example and another example of an erasable list.

DETAILED DESCRIPTION OF THE PREFERRED EMBODIMENTS

Figure 1:
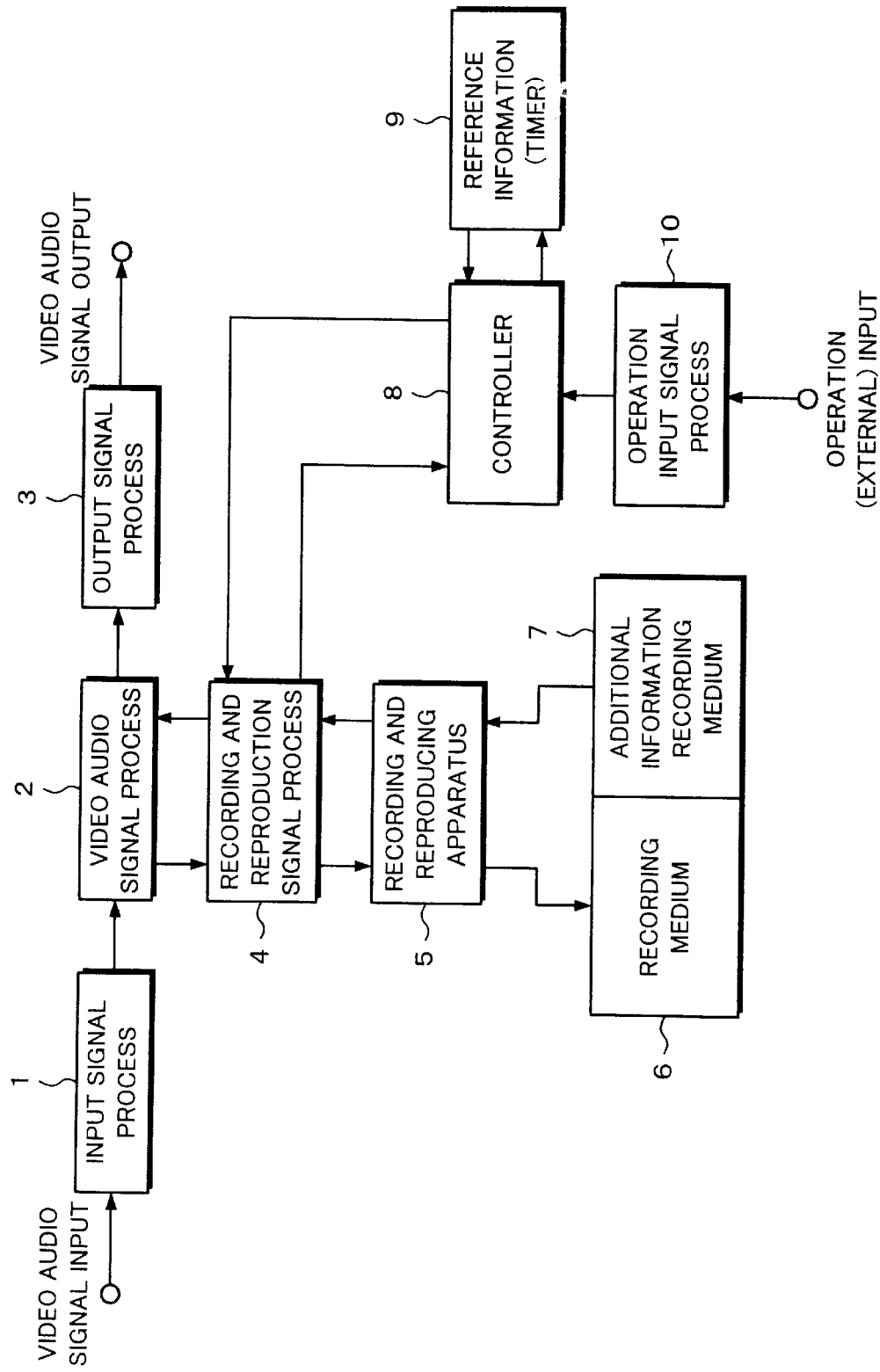
FIG. 1 is a block diagram of an embodiment of the invention.

An embodiment in which the invention is applied to a recording and reproducing apparatus of a main signal such as video and audio signals (hereinafter, referred to as a video audio signal) will now be described hereinbelow with reference to FIG. 1. The video audio input signal to be recorded is supplied to an input signal processing unit shown at 1. In the input signal processing unit 1, a signal level is adjusted and information necessary upon signal recording is detected.

An output signal of the input processing unit 1 is supplied to a video audio signal processing unit 2. The video audio signal processing unit 2 converts the video audio signal to a signal suitable for recording. Upon recording, a process for separating the video signal to a luminance signal and a chrominance signal, a conversion corresponding to a recording system of the audio signal, a band limitation by a filter, an analog/digital conversion, a separation to form a timing necessary for a process, a process for compressing an information amount of the recording signal, and the like are executed in the video audio signal processing unit 2. Upon reproduction, the video audio signal processing unit 2 executes processes opposite to those processes. A signal which is outputted from the video audio signal processing unit 2 upon reproduction is supplied to an output signal processing unit 3, is subjected to processes such as amplification and the like, and is outputted as a reproduction signal.

The signal which is outputted from the video audio signal processing unit 2 upon recording is supplied to a recording and reproduction signal processing unit 4. A signal which is outputted from the recording and reproduction signal processing unit 4 upon reproduction is supplied to the video audio signal processing unit 2. The recording and reproduction signal processing unit 4 converts the video audio signal and information which is added to the video audio signal into a signal format in which they can be recorded to the recording medium. An output signal from the recording and reproduction signal processing unit 4 upon recording is supplied to a recording and reproducing apparatus 5. A signal from the recording and reproducing apparatus 5 is inputted to the recording and reproduction signal processing unit 4 upon reproduction.

The processes of the recording and reproduction signal processing unit 4 are different in dependence on a recording and reproducing system (analog recording, digital recording, or the like) or the kind (magnetic tape, magnetic disk, optical disk, semiconductor memory, etc.) of recording medium. Specifically speaking, FM modulation/demodulation in case of the analog recording, formation on a recording unit (frame, block, or the like) basis/decomposition on a recording unit basis in case of the digital recording, mixture/separation of additional information, formation of a parity/error correction of an error correction code, a process of the recording information, and the like are executed in the recording and reproduction signal processing unit 4. In the embodiment of the invention, control signals and additional information which are necessary for those processes are supplied from a controller 8 to the recording and reproduction signal processing unit 4. The reproduced additional information is supplied from the recording and reproduction signal processing unit 4 to the controller 8.

The recording and reproducing apparatus 5 executes a process to record the signal converted by the recording and reproduction signal processing unit 4 onto a recording medium 6. The recording medium 6 is the forgoing medium to/from which the video audio signal can be recorded and reproduced. An additional information recording medium 7 is provided in order to record and reproduce the additional information in association with the recording and reproduction of the video audio signal. It is also possible to use a partial recording region of the recording medium 6 as an additional information recording medium 7 or another different recording medium can be also used. Further, it is also possible to select the recording medium 6 and additional information recording medium 7 or to simultaneously use those two recording media in accordance with the kind of additional information.

The additional information comprises content information and time information concerning the contents of the video audio signal to be recorded and reproduced. As content information, in case of the video audio signal of a broadcasting program, a title, day and hour of the broadcasting, a broadcasting channel, a length of program, and the like can be set. In this instance, information to identify a genre (namely, movie, drama, news, weather forecast, etc.) of the video audio signal is used as content information. Time information is information (year/month/day, hour/minute/second) of the recording time. As time information, information of a recording start time and/or a recording end time is used. Generally, the recording end time is used. The additional information is encoded data (digital data) and a character, a numeral, and a symbol are expressed by using a BCD code, a standardized character code (for example, ASCII code), or the like.

The controller 8 is made up of a microcomputer. The recording and reproduction signal processing unit 4, recording and reproducing apparatus 5, and the like are controlled by the controller 8. The additional information (time information and content information) is supplied from the controller 8 to the recording and reproduction signal processing unit 4 and the additional information can be recorded in correspondence to the video audio signal to be recorded.

A reference information unit (database) 9 and an operation input signal processing unit 10 are provided in association with the controller 8. An operation input generated on the basis of the operation of a key or the like of the user is supplied to the operation input signal processing unit 10. The operation input signal processing unit 10 generates content information corresponding to the operation input. The content information is supplied to the recording and reproduction signal processing unit 4 via the controller 8. Therefore, the user can record the content information (genre) according to the video audio signal to be recorded to the additional information recording medium 7. A timer is included in the reference information unit 9. Time information showing the recording time (present time) generated by the timer is supplied to the recording and reproduction signal processing unit 4 via the controller 8. The time information is recorded onto the additional information recording medium 7.

Upon reproduction, when the content information reproduced from the additional information recording medium 7 is given from the controller 8 to the reference information unit 9, the information of the preserving period is supplied from the reference information unit 9 to the controller 8 in correspondence to the content information. The reference information unit 9 is referred to for the controller 8 to discriminate whether the video audio signal of the recorded region can be erased or not.

Figure 2:
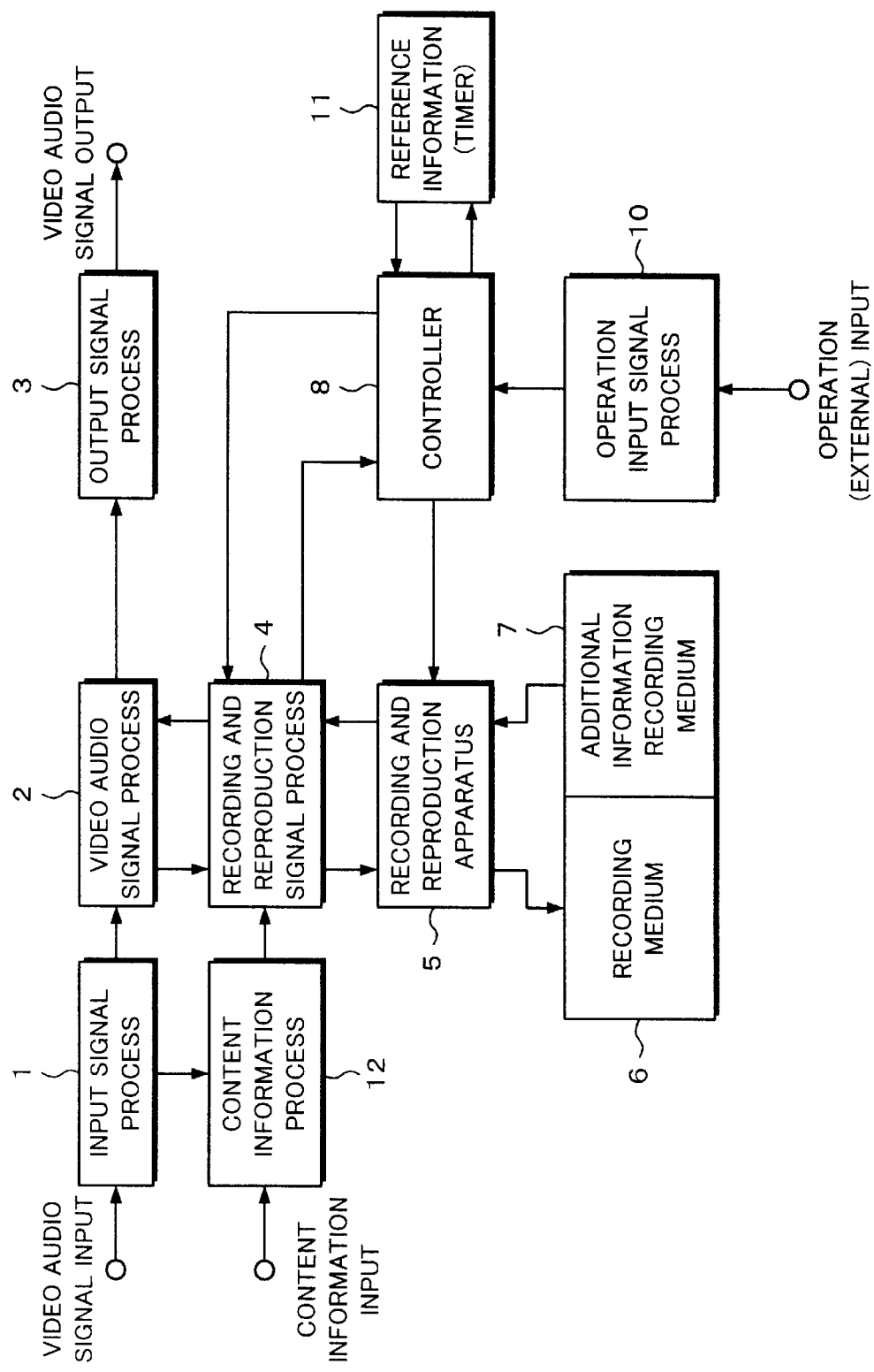
FIG. 2 is a block diagram of another embodiment of the invention.

In the embodiment shown in FIG. 1 mentioned above, the time information is generated by the timer and the content information is generated by the operation (external) input. The invention is not limited to this construction but those content information can be also recorded when the input signal includes the content information or the content information is inputted in parallel with the input signal. FIG. 2 shows another embodiment of the invention which is applied to such a case.

In FIG. 2, the content information is included in the inputted video audio signal. An input terminal to which the content information that is transmitted in parallel with the input video audio signal is inputted is also provided. The input signal processing unit 1 executes a process for separating the content information from the input video audio signal. The content information that is inputted in parallel and the separated content information are supplied to a content information processing unit 12. The content information processing unit 12 converts those content information as additional information into a signal format (data format) suitable for recording and reproducing.

The content information generated by the content information processing unit 12 is supplied to the recording and reproduction signal processing unit 4. The main signal is recorded to the recording medium 6 and is reproduced from the recording medium 6. The content information supplied to the recording and reproduction signal processing unit 4 is recorded to the additional information recording medium 7 together with the time information and is reproduced from the recording medium 6.

The content information is inserted as digital data for a part of a vertical blanking period of the input video audio signal. The content information can be inserted by using a predetermined format of the well-known character multiplex broadcasting. It is also possible to decode the inserted character information by a decoder of the character multiplex broadcasting and to input the content information in parallel with the video audio signal. As another method, it is also possible to input the content information by another input apparatus and to generate it. Further, the time information showing the recording time is generated by the timer of the reference information unit 9 in a manner similar to the embodiment. However, it is also possible to input the time information in parallel with the video audio signal together with the content information and to record the time information.

In the embodiment and another embodiment of the invention mentioned above, as shown in FIG. 3, the reference information unit 9 is constructed such that reference information (databases) to specify preserving periods a, b, c, . . . is stored into a memory, for example, a non-volatile semiconductor memory in correspondence to content information A, B, C, . . . . The preserving period is a period of time from the recording until the erasure is permitted. A duration of the necessary preserving period generally differs depending on the genre of the recorded main signal. For example, the genre of news or weather forecast needs instantaneousness and significance decreases with the elapse of time. Therefore, such a genre is set to a short preserving period as compared with the other genres. On the other hand, it is desirable to set the preserving period of movie to a long period.

Further, as a method of setting the preserving period of the reference information unit 9, any method other than the foregoing method can be used. For example, the preserving period can be also set by using a broadcasting time zone of the recording contents as content information. Since there is a case where the program contents are deviated in dependence on the broadcasting time zone and there is a case where significance differs. For instance, the recording region where a program of a broadcasting time zone whose significance is considered to be low has been recorded is set to a short preserving period than those in the other broadcasting time zones. The content information as conditions to set such a preserving period can be also compoundly applied and the priority, combining method, and the like of the content information are set. For example, by combining the foregoing genre information and broadcasting time zone information, the preserving period can be also set finer.

Further, by using the information such as a title of the program or the like, even in the case where the continuous program which is repeatedly broadcasted at a predetermined period was recorded, a preserving period such that the recording region is not erased until the program of the next time is recorded can be set. Moreover, the preserving period of the recording region set by other conditions can be also changed by information indicating whether the program is a program to be rebroadcasted or not. As mentioned above, all of the content information as a hint of the contents to be recorded can be used for the setting of the preserving periods.

The setting or change of the preserving period mentioned above can be also performed by an operation input from the outside. With this method, it is possible to cope with a difference between the situations, a change in situation, or the like and to set more effectively. In this case, the reference information unit 9 possesses a plurality of content information and the content information which is actually used can be also selected by an operation input. It is also possible to construct in a manner such that the reference information is recorded to the recording medium 6 or additional information recording medium 7 and, when the recording medium 6 or additional information recording medium 7 is exchanged, proper reference information is read to the reference information unit 9.

An example of a method of recording additional information to the additional information recording medium 7 will now be described. The recording medium 6 of the video audio signal is divided into a plurality of recording regions. Upon recording, the recording is performed on a unit basis of the recording region. Regions corresponding to the recording regions of the video audio signal are also assured on the additional information recording medium 7. The video audio signal is recorded into each recording region on the recording medium 6 and, at the same time, the additional information is encoded and recorded into the corresponding recording region on the additional information recording medium 7. When the video audio signal is reproduced from the recording medium 6, the additional information is reproduced from the corresponding recording region on the additional information recording medium 7. The additional information recording medium 7 can be also realized even by using a partial recording region on the recording medium 6.

In the case where the information of the time or capacity of every series of recording operations of the program or the like can be used, the additional information recording medium 7 can be also realized by using the time or capacity. That is, a region of every series of recording operations which are identified by the time or capacity is provided on the additional information recording medium 7 and the additional information of the series of recording operations is recorded there. In the case where the series of recording operations use a recording region (sector or the like) as a minimum unit of the recording or reproduction of the recording medium, information (sector number and the like) of the recording region to be used is also simultaneously recorded. Thus, when recording by using a plurality of recording regions, the additional information can be made common among a plurality of recording regions and a searching process which is executed when the erasable recording region is selected can be easily and promptly executed.

Further, as another method, when the video audio signal is recorded onto the recording medium 6, the additional information can be also compoundly encoded together with the video audio signal and recorded every divided recording region on the recording medium. For example, when the video audio signal is recorded as a digital signal, the additional information can be recorded as an ID signal, subdata, or the like in the format of the recording data.

In the embodiment and another embodiment of the invention mentioned above, processes for selecting the recording region upon recording and newly recording the video audio signal into the selected recording region are executed. The processes are executed in the controller 8. Flowcharts of FIGS. 4 and 5 show those processes.

Figure 4:
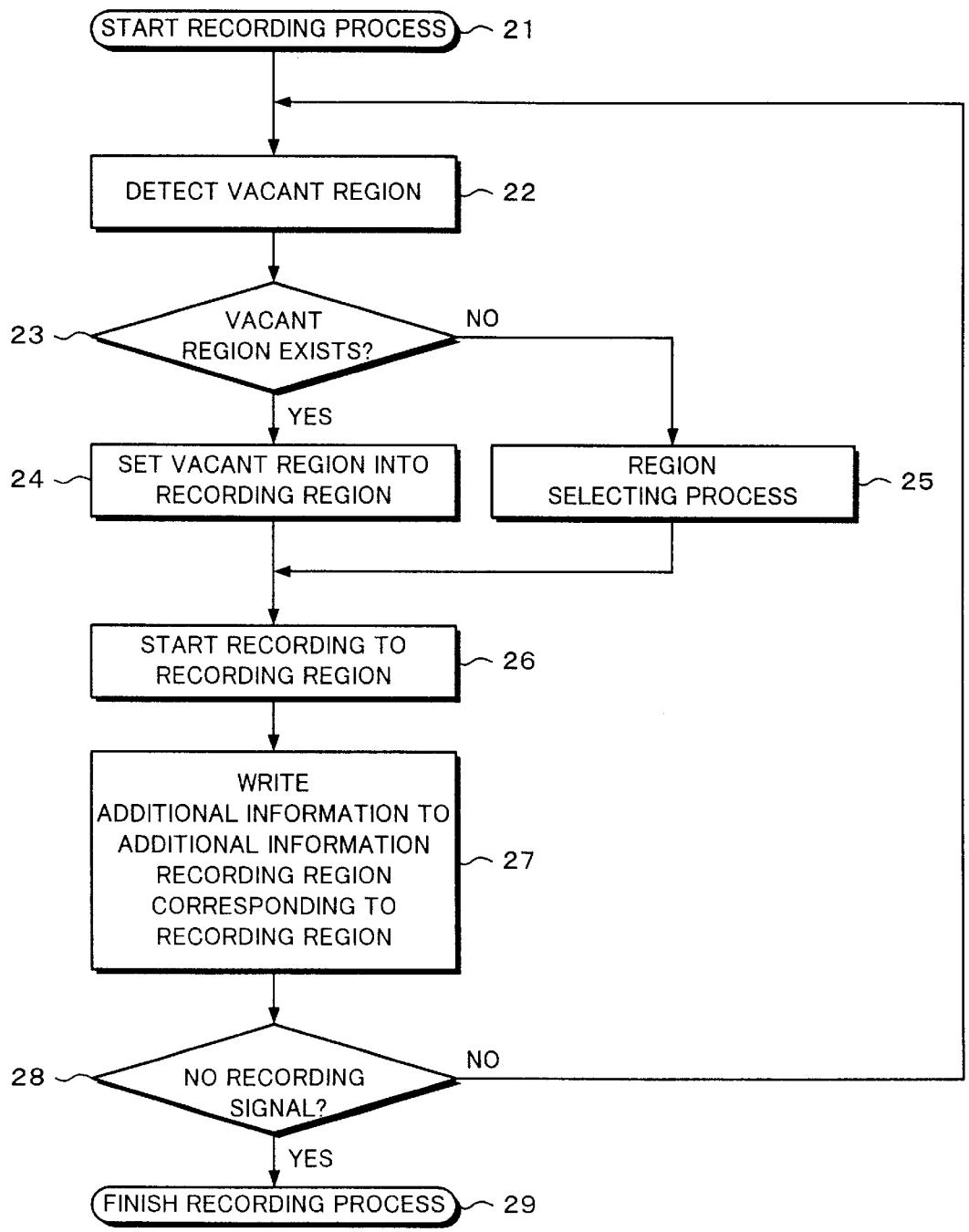
FIG. 4 is a flowchart for use in explanation of the invention.
Figure 5:
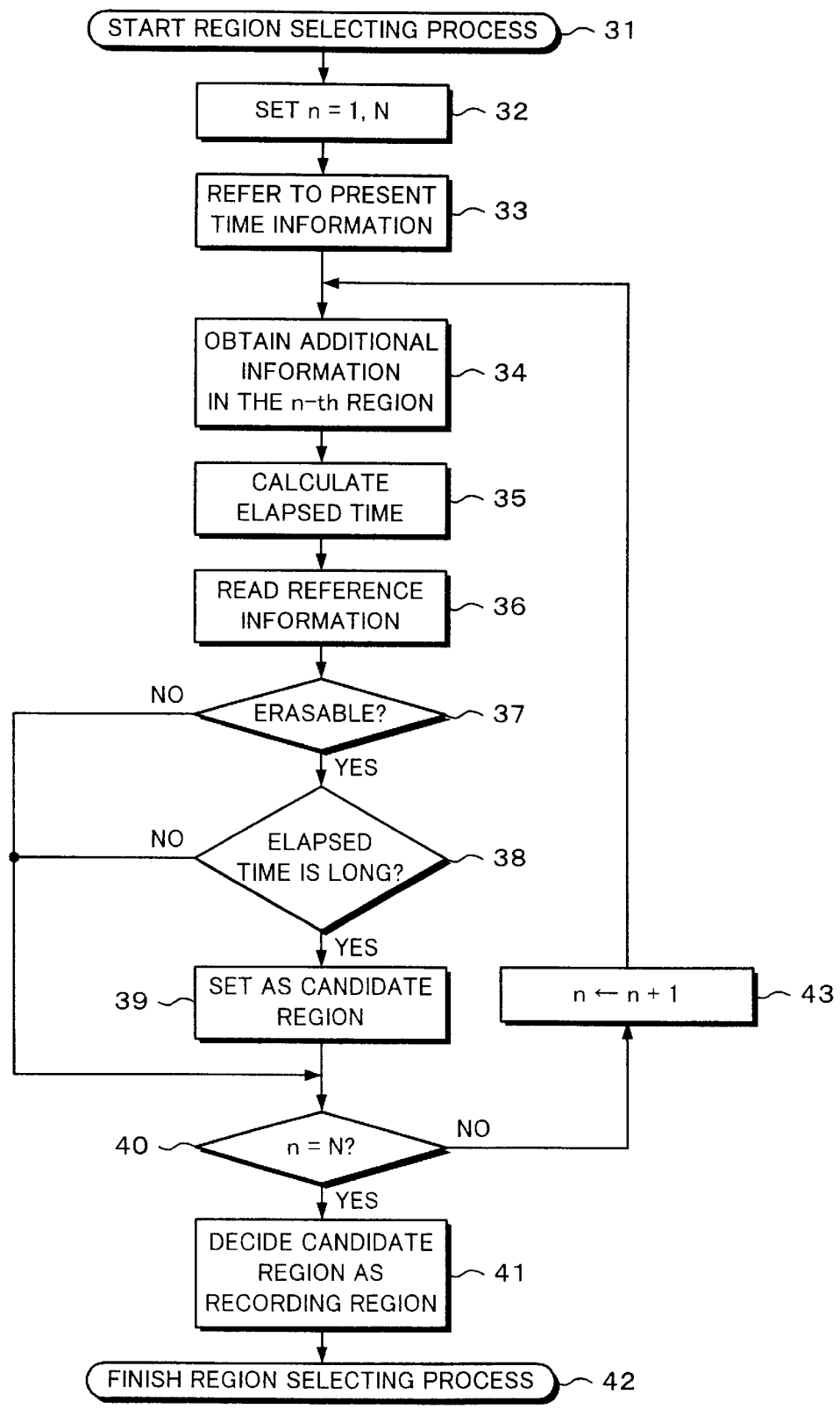
FIG. 5 is a flowchart for use in explanation of a part of FIG. 4.

As shown in FIG. 4, a recording process is started (step 21) and a vacant region of the recording medium 6 is first detected (step 22). The vacant region is a non-used region and a region where the recording contents are deleted and erased by an operation input. The recording is performed by preferentially using the vacant region. Data which can distinguish the vacant region, for example, erasure data or an ID, a flag, or the like is recorded into the vacant region of the recording medium 6. Each time the recording process is performed, each time the recording medium 6 is loaded, or each time a power source is turned on, all of the vacant regions on the recording medium 6 are detected on the basis of those data. A detection result is stored into a semiconductor memory or the like and the data is rewritten in correspondence to the change of the used region from the vacant region to the recorded region after completion of the recording. As another method, it is also possible to construct such that a management region (directory region, header region, or the like) in which the using situation of the recording medium 6 was recorded is provided and, when the recording or erasure is performed, this fact is recorded into the management region.

The presence or absence of the vacant region is determined in step 23. When there is a vacant region, the vacant region is set to a recording region (step 24). If there is no vacant region, a region selecting process (step 25) for selecting the erasable region among the recorded regions as a recording region is executed. The region selecting process will be explained hereinlater with reference to FIG. 5. The recording of a new video audio signal to the recording region (vacant region or the selected recorded region) is started (step 26).

Together with the recording of the video audio signal, the additional information (time information and content information) is written into the additional information recording region corresponding to the recording region on the additional information recording medium 7 with reference to the present time shown by the timer (step 27). In step 28, whether the recording signal remains or not is decided. When there is the recording signal, the processing routine is returned to the detecting process of the vacant region in step 22 and the processes as mentioned above are repeated. When the recording of the recording signal is finished, the recording process is finished (step 29).

The region selecting process 25 will now be described in more detail with reference to the flowchart of FIG. 5. Now, assuming that N recorded regions exist on the recording medium 6, and whether the recorded region can be selected as recording regions or not is sequentially discriminated in accordance with the recording order from the first recorded region to the N-th recorded region. The region selecting process 25 is executed every recording process as described with reference to the flowchart of FIG. 4.

The region selecting process is started (step 31). In step 32, n=1 is set and the value of N is initially set. As an example, the value of the recorded region N is obtained as a value in which the number of vacant regions is subtracted from the total number of recording regions on the recording medium 6. The present time is referred by the timer in the reference information unit 9 (step 33). The time information and content information of the n-th region are obtained (step 34). The elapsed time is calculated by (the present time information)—(the obtained time information) (step 35).

By giving the obtained content information to the reference information unit 9, the preserving period information corresponding to the content information is read into the controller 8 (step 36). The elapsed time calculated in step 35 is compared with the preserving period. For example, (the elapsed time—the preserving period) is calculated. Now, assuming that this difference is called an erasable period, a case of (erasable period≧0) can be determined to be an erasable state. As another method, it is also possible to construct such that the elapsed time is added to the recording time shown by the time information, the erasable time is calculated, the erasable time and the present time are compared, and if the erasable time is the past time, it is possible to decide that this situation is the erasable state. In step 37, whether the n-th recorded region is erasable or not is determined as mentioned above.

If it is erasable, the time of a candidate region and the elapsed time are compared (step 38). The recorded region corresponding to the longest elapsed time among the erasable recorded regions is finally selected as a recording region here. The comparison of the elapsed time is successively performed. The recorded region corresponding to the longest elapsed time among the compared recorded regions is used as a candidate region. When the recorded region of (n=1) which is first examined is erasable, this recorded region obviously becomes a candidate region (step 39).

In place of the elapsed time, it is also possible to compare with respect to the foregoing erasable period or the time (erasable time) when it becomes erasable and to determine the recorded region corresponding to the longer erasable period or the recorded region corresponding to the former erasable time as a candidate region.

When it is decided to be not erasable in step 37 or when it is determined that the elapsed time is not longer than that of the candidate region in step 38, (n=N?) is determined in step 40. When (n=N), since this means that all of the recorded regions have been examined, the candidate region is decided as a recording region (step 41). The region selecting process is finished (step 42). When (n≠N), the value of n is increased by "1" in step 43 and the processing routine advances to step 34 [the time information and content information of the (n+1)th recording region are obtained). Processes similar to those mentioned above are executed with respect to the next (n+1)th region.

In the above processes, when the erasable region is selected from the recorded regions, the reference information is read out and used. However, it is also possible to construct such that when the video audio signal is recorded, the reference information is read out and the erasable time is calculated, thereby forming a list of erasable regions and executing the region selecting process with reference to this list. That is, in case of recording the video audio signal for the vacant region or the recorded region decided in the foregoing region selecting process, the additional information which is recorded in association with the video audio signal is added to the list.

FIG. 6A shows an example of the erasable region list. This list relates to an example in which recording region numbers (a series of recording units like programs, track numbers, sector numbers, etc.) i, j, k, . . . in which the video audio signals have been recorded and their additional information (content information and time information) are sequentially written in accordance with the order. The recording regions are ordered by the erasable times on the basis of the additional information and the reference information. The video audio signal which is newly recorded is added to the list at a position of the order that is determined by the erasable time calculated from the additional information. The list is updated as mentioned above. When the region selecting process is carried out upon recording, this list is referred to and the recorded region of the first order is selected as a recording region.

FIG. 6B shows another example of the erasable region list. The numbers of the recorded regions are sequentially arranged from the early erasable time. In the example of FIG. 6B, an erasable time Ti of the recorded region of No. i arrives earliest and an erasable time Tj of the recorded region of No. j subsequently arrives. When the region selecting process is executed upon recording, this list is referred to and the recorded region of the first order is selected as a recording region. At the time point of the end of the recording process, the list is updated.

Further, a list in which only the recording region numbers are ordered can be also used. In this case, when the list is updated, it is necessary to reproduce the additional information recorded on the additional information recording medium 7 and to calculate the erasable time from the reference information. Furthermore, it is also possible to form a list in which not only the erasable regions but also all of the recorded regions have been ordered and to set a flag indicative of the permission or inhibition of the erasure into each of the recorded regions.

By forming the list as mentioned above, the region selecting process can be simplified and executed at a high speed. It is also possible to write the list onto the recording medium 6 when the recording medium 6 is exchanged and to subsequently read the list to the controller 8 when the recording medium 6 is used. It is also possible to execute the region selecting process to all of the recorded regions on the recording medium 6 when the recording medium 6 is exchanged and to form a list by those processes.

As described above, according to the invention, when there is no vacant region, the erasable region among the recorded regions can be properly selected and the recording medium can be effectively used. According to the invention, when the erasable region is selected among the recorded regions, whether it is erasable or not is determined in accordance with the contents on the basis of the recording times and contents of the recorded information and the reference information. Therefore, different from the method of merely selecting the erasable region on the basis of only the discrimination result about whether the recording is new or old, the erasable region can be properly selected in accordance with the contents.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An information signal recording and reproducing apparatus for selecting an arbitrary region of a recording medium and recording and reproducing, wherein an information signal recorded on said recording medium is constructed by a main signal and additional information which was made correspond to said main signal, said additional information is constructed by time information showing a recording time of said main signal and content information showing the contents of said main signal, and said apparatus comprises:

reference information holding means for holding preserving period information of every said content information; and control means for performing processes such that the presence or absence of a vacant region is detected, when said vacant region exists, the signal is recorded into said vacant region, when said vacant region doesn't exist, said additional information of a recorded region is reproduced, an elapsed time of the recorded region is calculated from said time information in said reproduced additional information and present time information, whether the recorded region can be erased or not is decided from said elapsed time and said preserving period information corresponding to said content information in the reproduced additional information, and the signal is recorded to the recorded region which was determined to be erasable.

2. An information signal recording and reproducing apparatus according to claim 1, characterized in that said apparatus has means for inputting said additional information from an outside, and said additional information is inputted and recorded upon recording of said main signal.

3. An information signal recording and reproducing apparatus according to claim 1, characterized in that said additional information is inputted in association with the main signal which is recorded.

4. An information signal recording and reproducing apparatus according to claim 1, characterized in that said main signal and said additional information are recorded to a common recording medium.

5. An information signal recording and reproducing apparatus according to claim 1, characterized in that said main signal and said additional information are recorded to different recording media.

6. An information signal recording and reproducing apparatus according to claim 1, characterized in that said reference information holding means can select or change a condition setting on the basis of an input from an outside.

7. An information signal recording and reproducing apparatus according to claim 1, characterized in that said control means executes a process for deciding whether the signal can be erased or not every process for recording the signal.

8. An information signal recording and reproducing apparatus according to claim 1, characterized in that said control means executes a process for deciding whether the signal can be erased or not when the recording medium is loaded.

9. An information signal recording and reproducing apparatus according to claim 1, characterized in that said control means forms a list in which the erasable regions determined in the recorded region are arranged in accordance with the order corresponding to the positions before and after the time when the signal can be erased.

10. An information signal recording and reproducing apparatus according to claim 1, characterized in that said control means forms a list in which the erasable regions determined in the recorded region are arranged in accordance with the order corresponding to the duration of a period of time when the signal can be erased.

11. An information signal recording and reproducing apparatus according to claim 1, characterized in that in said recording region, a series of lengths of said main signal is set to a unit.

12. An information signal recording and reproducing apparatus according to claim 1, characterized in that in said recording region, a minimum data amount to be recorded and reproduced is set to a unit.

13. An information signal recording and reproducing method of selecting an arbitrary region of a recording medium and recording and reproducing, characterized in that:

an information signal recorded on said recording medium is constructed by a main signal and additional information which was made correspond to said main signal, said additional information is constructed by time information showing a recording time of said main signal and content information showing the contents of said main signal; and there are executed processes such that the presence or absence of a vacant region is detected, when said vacant region exists, the signal is recorded into said vacant region, when said vacant region doesn't exist, said additional information of a recorded region is reproduced, an elapsed time of said recorded region is calculated from said time information in the reproduced additional information and present time information, whether the recorded region can be erased or not is decided from said elapsed time and said preserving period information corresponding to said content information in said reproduced additional information, and the signal is recorded into the recorded region which was determined to be erasable.

* * * * *